United States Patent [19]

De Groot

[11] Patent Number: 4,483,275

[45] Date of Patent: Nov. 20, 1984

[54] TRAINING HALTER FOR ANIMALS

[76] Inventor: Alice A. De Groot, P.O. Box 340, Sandia Park, N. Mex. 87047

[21] Appl. No.: 467,316

[22] Filed: Feb. 17, 1983

[51] Int. Cl.³ .......................... A01K 25/00; B68B 1/02
[52] U.S. Cl. ......................................... 119/130; 54/24
[58] Field of Search ................. 119/96, 109, 129, 130; 54/24, 26, 85

[56] References Cited

U.S. PATENT DOCUMENTS

| | | | |
|---|---|---|---|
| 321,957 | 7/1885 | Enoch | 54/24 |
| 409,867 | 8/1889 | Philpott | 54/24 |
| 1,276,462 | 8/1918 | Welch et al. | 119/130 |
| 2,510,337 | 6/1950 | Franklin | 119/130 |
| 3,312,039 | 4/1967 | Reed | 54/24 |

*Primary Examiner*—Robert P. Swiatek
*Attorney, Agent, or Firm*—Charmasson & Holz

[57] ABSTRACT

A training halter is provided for animals having muzzles, such as dogs, which in essence replaces the collar and leash and which diverts the tugging force to a self-cinching strap looped around the muzzle, so that the trainer, rather than merely pulling against the mass of the animal, can turn its head in the direction to which he wishes the animal to move.

3 Claims, 5 Drawing Figures

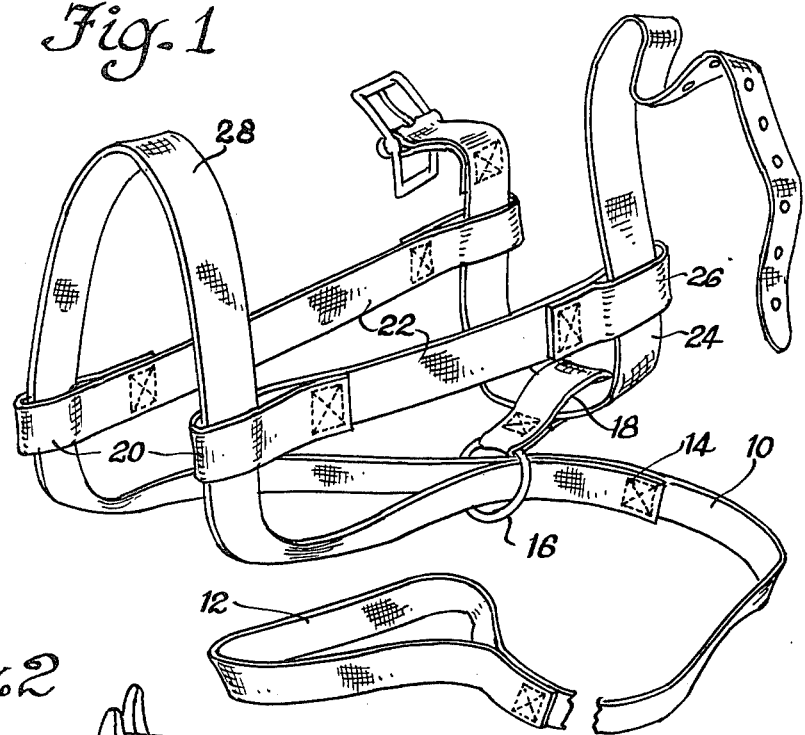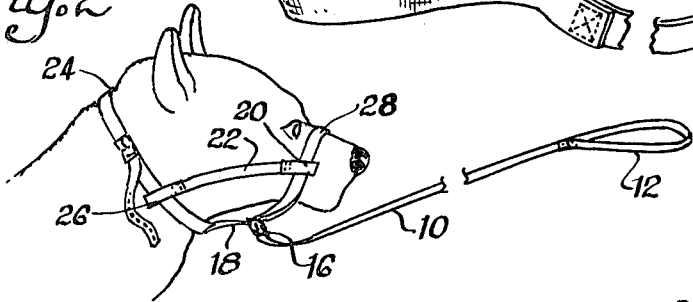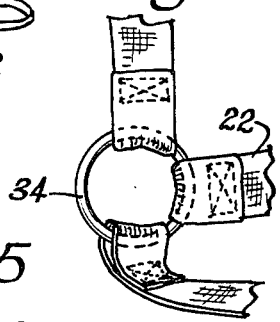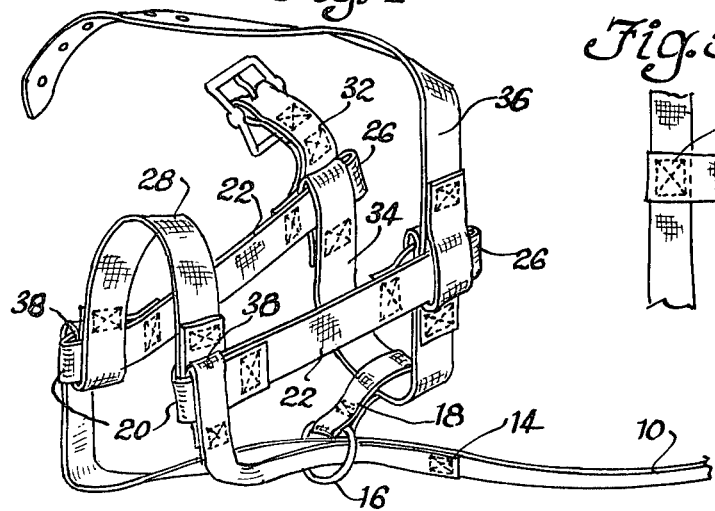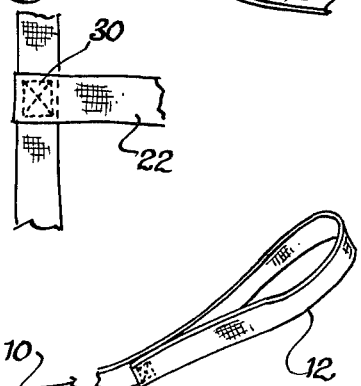

TRAINING HALTER FOR ANIMALS

BACKGROUND OF THE INVENTION

The invention relates to animal training and restraint devices such as halters, muzzles, and collars on leashes used in the training and control of animals, particularly animals having muzzles such as canines.

These devices are used to bend the animal's actions to the master's will. The idea is to cause the animal to voluntarily comply, and avoid the physical tug-of-war that occurs when the animal wants to go a different direction than its master, or wants to move faster or slower than the master. Beyond the simple leash and collar, which engenders this type of contest, there are currently in use choking collars, which are simply a canine version of the hangman's noose, and inwardly spiked collars, which when tugged by the leash causes the animal to prefer to acquiesce to the master's wishes rather than suffer the pain of the spikes digging into its neck.

Both the choking collar and the spiked collar are based on the infliction of pain to restrain the animal, and are looked upon by some as being inhumane. In addition, they may not be very effective, first, because the directional guidance provided the dog is somewhat rough, and second, because the animal will respond in inverse proportion of the thickness of its pelt at the neck.

There is thus a need for a device which will more accurately direct the dog, and will do so without the infliction of pain on the animal.

SUMMARY OF THE INVENTION

The above-stated need is provided by the instant invention which directs the dog not by the infliction of a pain the aversion of which causes the animal to move in the right direction, but by means of a special halter by virtue of the construction of which the tension applied to the leash is not directed to the neck of the animal at all, at least not in substantial part, but is instead directed toward the animal's muzzle.

Thus, rather than operating on the principal of brute force to control the animal, with or without the infliction of accompanying pain to give the operator some leverage, the instant invention operates on the theory that upon turning the animal's nose to point in the direction the animal should move, the animal will in fact proceed to move in that direction.

BRIEF DESCRIPTION OF THE DRAWINGS

FIG. 1 is a perspective view of one embodiment of the invention;

FIG. 2 illustrates the halter of FIG. 1 in use on a canine;

FIG. 3 illustrates an alternative strap connector means;

FIG. 4 illustrates a harness similar to that shown in FIG. 1 but having modified strap connections; and FIG. 5 illustrates yet a fourth manner of innerconnecting the straps at the junctures of the halter.

DETAILED DESCRIPTION OF THE PREFERRED EMBODIMENTS

In FIG. 1 the first embodiment of the halter is shown wherein the leash 10, having a hand loop 12, bifurcates at 14 with both of the bifurcations extending through the cinch ring 16 which is supported on the connector strap 18, the bifurcated portion of the leash extending through the slip loops 20 of the lateral strap supports 22, and up and over the muzzle of the dog. The connector strap is engaged around the collar member 24 so that as shown in FIG. 2, as tension is applied to the leash, its effect is felt primarily around the muzzle area of the dog. Also, the more tightly the leash is pulled, the tighter the loop will pull against the animal's muzzle. The purpose of this invention is to obtain a more secure grip of the animal's muzzle, without permanently restraining the animal from opening its mouth or causing pain. Instead, it has the effect of making the halter self-adjusting to a certain extent. Conceivably, the halter could be made more self-adjusting by incorporating the feature of adjustability of any of the straps, such as, for example, the lateral strap supports 22, which could be made adjustable by virtue of a Velcro ® latch system or the buckle system illustrated on the collar member 24.

The embodiment illustrated in FIG. 1 is the simplest of all embodiments because the slip loops 20, together with the slip loops 26 at the rear end of the lateral strap supports, loosely engage the front loop 28 and the collar 24 without any permanent attachment, although clearly the leash cannot be removed from the halter. In order to maintain the lateral strap supports 22 at the approximate same elevation, and along the same portion of the animal's face, a loop and ring system shown in FIG. 3 could be used for the slip loop connection at 20 or 26. That is, the lateral strap loop 22 indicated in part in FIG. 3 would be running rearward or forward, depending on which slip loop the ring replaced. This would prevent movement of the members at these joints, except that it would provide angular movement about the ring, enabling the joint to adjust to the configuration of the animal's physiology.

Another modification shown in FIG. 5 is identical to that shown in FIG. 3, except that instead of utilizing the ring 34, the members are simply stitched together as indicated at 30. This would not only secure the lateral strap supports 22 against elevational movement, but would provide some angular rigidity as well. It will of course be borne in mind that although the strap material such as leather or Nylon should be strong, it should also be fairly flexible.

In FIG. 4, yet another embodiment is shown wherein the muzzle loop is comprised of an upper loop member 28 having looped tips, and the leash is bifurcated and terminates in two loops 38, which together with the loops of the upper loop member 28 engage the forward slip loops 20 of the lateral strap supports 22. The collar structure is similar, wherein the slip loops 26 are engaged by the loops of the three collar components 32, 34 and 36. This construction differs over the construction of FIG. 5, and even over that of FIG. 3, in that in addition to providing some angular adjustment of the straps relative to one another, it also provides a certain degree of relative translational motion which may be greater than that illustrated in FIG. 3, depending on the length of the loops 20 and 26.

In any of the embodiments, the halter can be engaged on the dog's neck and muzzle, and provide the master with greater control, without inflicting the pain associated with the former methods of controlling and training dogs.

It should also be noted that, should the animal become unruly and begin to tug forcefully, the self-cinching muzzle loop 28 will automatically lock itself in a position which will prevent the animal from biting.

A second ring could be provided in parallel with the cinch ring 16 to allow the trainer to lock the loop member 28 into a convenient position when the cinching of the muzzle is no longer necessary.

While the preferred embodiments of the invention have been described, other modifications may be made thereto and other embodiments may be devised within the spirit of the invention and the scope of the appended claims.

What is claimed is:
1. An training halter for dogs comprising:
   (a) a loop member for encircling the dog's muzzle;
   (b) a leash connected to said muzzle loop;
   (c) a unitary collar member shaped and dimensioned to completely surround the neck of the dog, and having means for securing the collar member around the neck;
   (d) said collar member supporting a ring cinch, said loop member having its lower portion passing through said ring cinch, and being connected to said leash, whereby tensioning said leash tightens down the loop member on the muzzle of the dog; and
   (e) a pair of lateral supports each having means for connecting its rear end and front end to said collar and loop member, respectively, on the opposite sides of the dog's head, said connecting means comprising front end and rear end slip loops, each of said members passing through the slip loop at the end of each lateral support on the opposite sides of the dog's head.
2. A halter according to claim 1, wherein said loop member passes over the top of said muzzle and through said front end slip loops, said leash being secured to said loop member under said slip loops, and said collar member passing through said rear end slip loops.
3. A halter according to claim 1, wherein said loop member comprises an upper loop member having a loop at each end, and said leash being bifurcated and terminating in two loops, said front end slip loops engage said loops on adjacent ends of said upper loop member and said leash on opposite sides of said muzzle to secure said loop member and leash together.

* * * * *